United States Patent
Bramson (10) Patent No.: US 8,439,088 B2
(45) Date of Patent: May 14, 2013

(54) ONE-WAY VALVE FOR A FUEL-TANK FILLING CONDUIT

(75) Inventor: Eric David Bramson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 12/782,816

(22) Filed: May 19, 2010

(65) Prior Publication Data
US 2011/0284128 A1    Nov. 24, 2011

(51) Int. Cl.
*B65B 1/04* (2006.01)
(52) U.S. Cl.
USPC ........... 141/350; 141/302; 220/86.3; 137/527
(58) Field of Classification Search .................. 141/301, 141/302, 350; 220/86.2, 86.3; 137/512.1, 137/527
See application file for complete search history.

(56) References Cited

U.S. PATENT DOCUMENTS

| | | | |
|---|---|---|---|
| 1,743,731 A * | 1/1930 | Scott | 126/285 R |
| 2,066,202 A | 12/1936 | Jay | |
| 2,145,758 A | 1/1939 | Fellows et al. | |
| 2,674,091 A * | 4/1954 | Malick | 60/39.77 |
| 2,800,920 A * | 7/1957 | Smith | 137/512.15 |
| 2,877,792 A * | 3/1959 | Tybus | 137/512.1 |
| 3,074,427 A * | 1/1963 | Wheeler, Jr. | 137/512.1 |
| 3,538,946 A * | 11/1970 | Hilsheimer | 137/512.1 |
| 3,787,022 A * | 1/1974 | Wilcox | 251/212 |
| 4,005,732 A * | 2/1977 | Buckner | 137/512.1 |
| 4,037,754 A * | 7/1977 | Wilhelmi et al. | 220/254.2 |
| 4,230,148 A * | 10/1980 | Ogle, Jr. | 137/512.1 |
| 4,321,944 A * | 3/1982 | Schutzer | 137/512.1 |
| 4,449,549 A * | 5/1984 | Weck | 137/512.1 |
| 4,457,333 A * | 7/1984 | Sharp | 137/454.2 |
| 4,607,661 A * | 8/1986 | Wessels et al. | 137/512.1 |
| 4,694,853 A * | 9/1987 | Goodwin | 137/512.1 |
| 4,714,172 A | 12/1987 | Morris | |
| 4,774,981 A * | 10/1988 | Mizusawa | 137/512.1 |
| 5,222,519 A * | 6/1993 | Sato et al. | 137/512.1 |
| 5,518,026 A * | 5/1996 | Benjey | 137/512.15 |
| 5,732,840 A | 3/1998 | Foltz | |
| 6,098,656 A * | 8/2000 | Farina | 137/512.1 |
| 6,253,788 B1 * | 7/2001 | Palvolgyi | 137/512.1 |
| 2003/0098304 A1 | 5/2003 | Foltz | |

FOREIGN PATENT DOCUMENTS

| | | |
|---|---|---|
| GB | 535220 | 4/1941 |
| GB | 554731 | 7/1943 |

OTHER PUBLICATIONS

Bramson, Eric David, "Fuel Filler Tube Anti-Siphon Device," U.S. Appl. No. 12/426,974, filed Apr. 21, 2009, 15 pages.

\* cited by examiner

*Primary Examiner* — Timothy L Maust
(74) *Attorney, Agent, or Firm* — Julia Voutyras; Alleman Hall McCoy Russell & Tuttle LLP (57) ABSTRACT

A one-way valve for a fuel-tank filling conduit deters siphoning and prevents back flow of fuel. The one-way valve comprises a blocking element arranged in the conduit and pivotable between a flow-blocking, object-insertion blocking first position and a flow-admitting, object-insertion blocking second position. In the second position the blocking element divides the conduit into flow areas of comparable width. The one-way valve further comprises a bias element that biases the blocking element to the first position.

21 Claims, 6 Drawing Sheets

ONE-WAY VALVE FOR A FUEL-TANK FILLING CONDUIT

TECHNICAL FIELD

This application relates to the field of motor vehicle engineering, and more particularly, to deterrence of fuel siphoning and prevention of back flow of fuel through a fuel-tank filling conduit.

BACKGROUND AND SUMMARY

A motor vehicle may have a fuel tank coupled to a filling conduit. The filling conduit may be fitted with a cap and configured, when the cap is removed, to receive a nozzle of a filling-station fuel pump. The fuel pump may be pressure regulated, so as to deliver the fuel over an allowed pressure range.

Other componentry, besides the cap, may be used to prevent fuel from exiting the fuel tank via the filling conduit. First, a flapper valve may be installed in the filling conduit. The flapper valve allows fuel to flow from the nozzle to the tank, but it prevents expanding vapor in the tank from forcing the fuel back out of the filling conduit when the tank is being filled. Second, a grating may be installed in the filling conduit. The grating prevents a siphon hose, if inserted into the filling conduit, from reaching the fuel in the tank.

Accordingly, U.S. Pat. No. 2,066,202 to Jay discloses a filling conduit fitted with a grating and with a flapper valve separate from the grating. The inventor herein has recognized, however, that such an approach may make it difficult to admit fuel to the fuel tank at an acceptably fast rate. This is because the grating and the check valve each exerts a back pressure on the flow of fuel through the filling conduit. Even when the back pressure across each of these components is made as small as possible, their combined effect may be such as to limit the flow rate of fuel through the filling conduit. Moreover, the filling-station fuel pump may be configured to automatically interrupt fuel delivery when a relatively small back pressure is sensed. Operator satisfaction may suffer, accordingly, as a result of repeated fueling interruptions caused by the combined back pressure of a grating and a flapper valve.

Therefore, one embodiment provides a one-way valve for a filling conduit of a motor-vehicle fuel tank. The one-way valve comprises a blocking element arranged in the conduit and pivotable between a flow-blocking, object-insertion blocking first position and a flow-admitting, object-insertion blocking second position. In the second position the blocking element divides the conduit into flow areas of comparable width. The one-way valve further comprises a bias element that biases the blocking element to the first position. In this system, the overall pressure drop in the filling conduit may be kept at a suitably low value while the fuel tank is being filled. Thus, the fuel may be delivered faster, with fewer interruptions and increased operator satisfaction. Moreover, the disclosed one-way valve provides a unitary replacement for a flapper valve and a grating, in that the pivotable blocking element itself acts as a grating.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted herein.

DETAILED DESCRIPTION

The subject matter of this disclosure is now described by way of example and with reference to certain illustrated embodiments. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
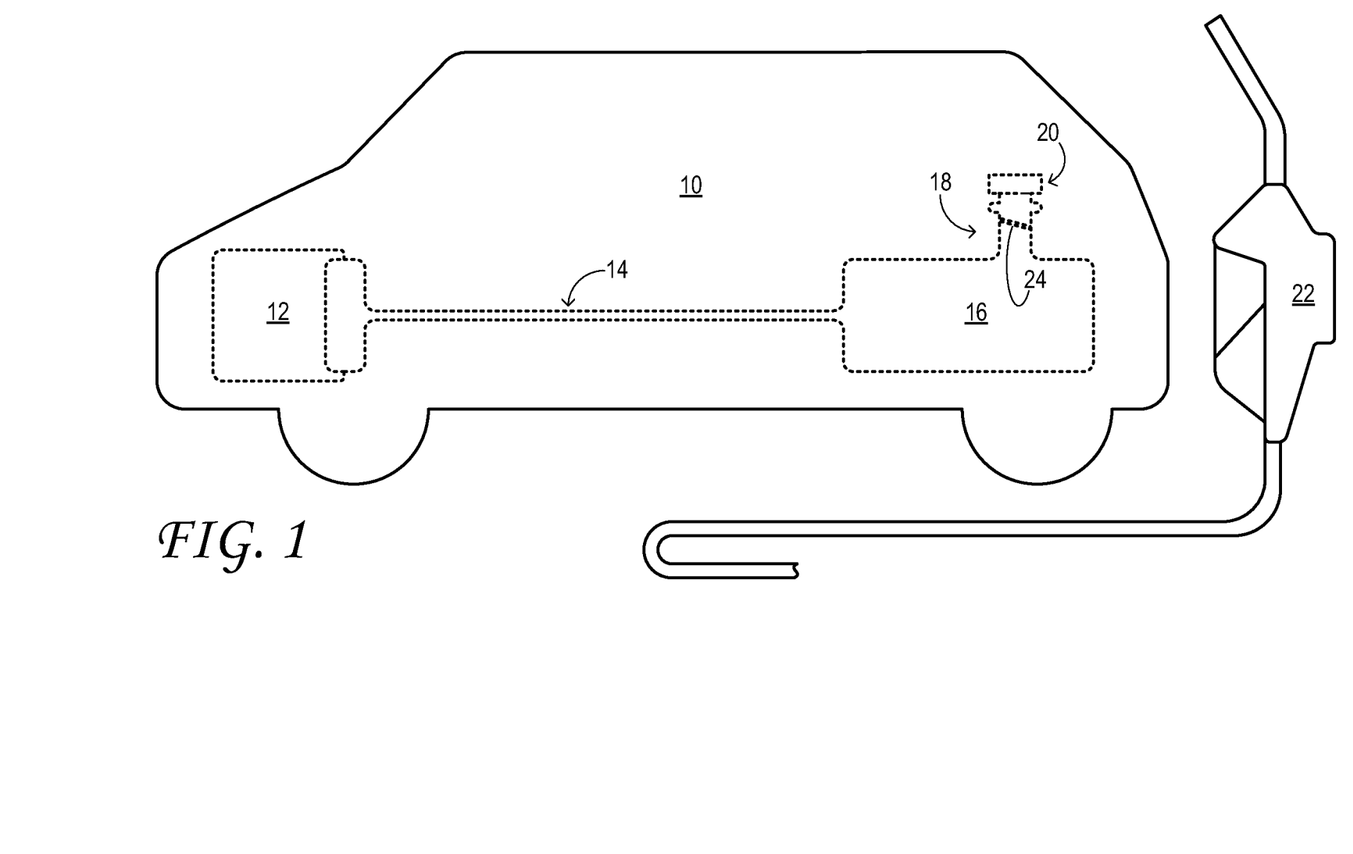
FIG. 1 schematically shows a motor vehicle in accordance with an embodiment of this disclosure.

FIG. 1 schematically shows example motor vehicle 10, which includes engine 12 and fuel system 14, in one embodiment. The fuel system is configured to store fuel and deliver fuel to the engine. Accordingly, the fuel system may comprise various fuel lines, fuel injectors, a fuel filter and a fuel pump. In the different embodiments of this disclosure, the engine may consume, and the fuel tank may store, a variety of different fuels—diesel, biodiesel, gasoline, alcohols, and gasoline-alcohol blends, for example. In one embodiment, the engine may be a flex-fuel engine. In another embodiment, the engine may consume, and the fuel tank may store, up to one-hundred percent ethanol.

Fuel system 14 further comprises fuel tank 16 and filling conduit 18 fluidically coupled to the fuel tank. As shown in FIG. 1, vapor-sealing cap 20 is coupled removably to the filling conduit. The vapor-sealing cap may or may not include a locking mechanism to limit access to the fuel in the fuel tank. The filling conduit is configured to receive nozzle 22 when vapor-sealing cap 20 is removed. Through the nozzle, fuel from a filling-station fuel pump is pumped into the filling conduit. In another embodiment, the vapor sealing cap may be omitted and other measures taken to prevent the escape of fuel and vapor from the fuel tank.

Continuing in FIG. 1, filling conduit 18 includes one-way valve 24. In the illustrated embodiment, the one-way valve is the only flow-affecting structure present in the conduit. In other words, there are no other check valves, flapper valves, or gratings present to prevent back flow of fuel or deter siphoning. Here the one-way valve adequately serves the combined functions of a flapper valve and a grating. It will be understood, however, that other embodiments fully consistent with this disclosure may include additional flow-affecting structure.

Figure 2:
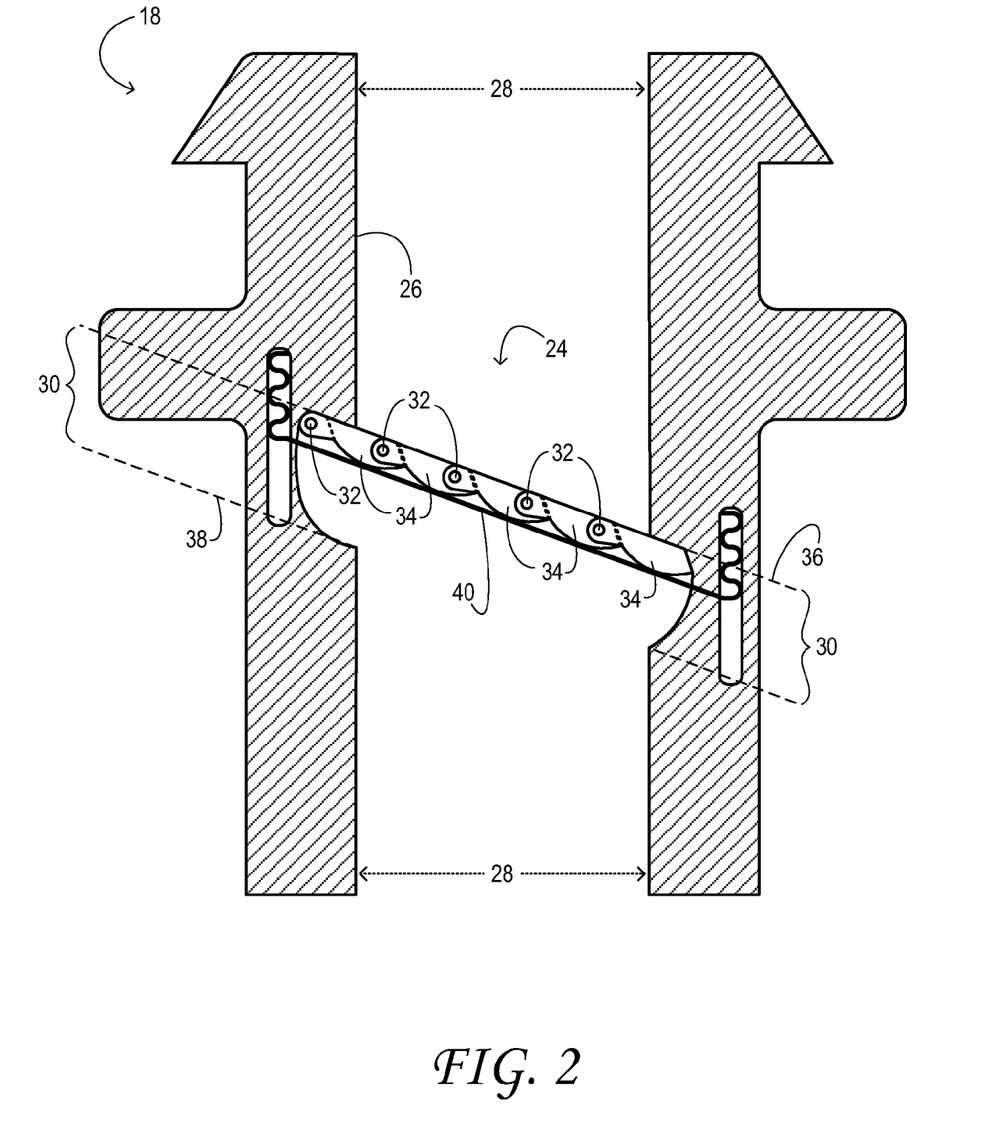
FIGS. 2, 3, and 4 schematically show cross-sectional views of a filling conduit of a motor vehicle in accordance with an embodiment of this disclosure.
Figure 3:
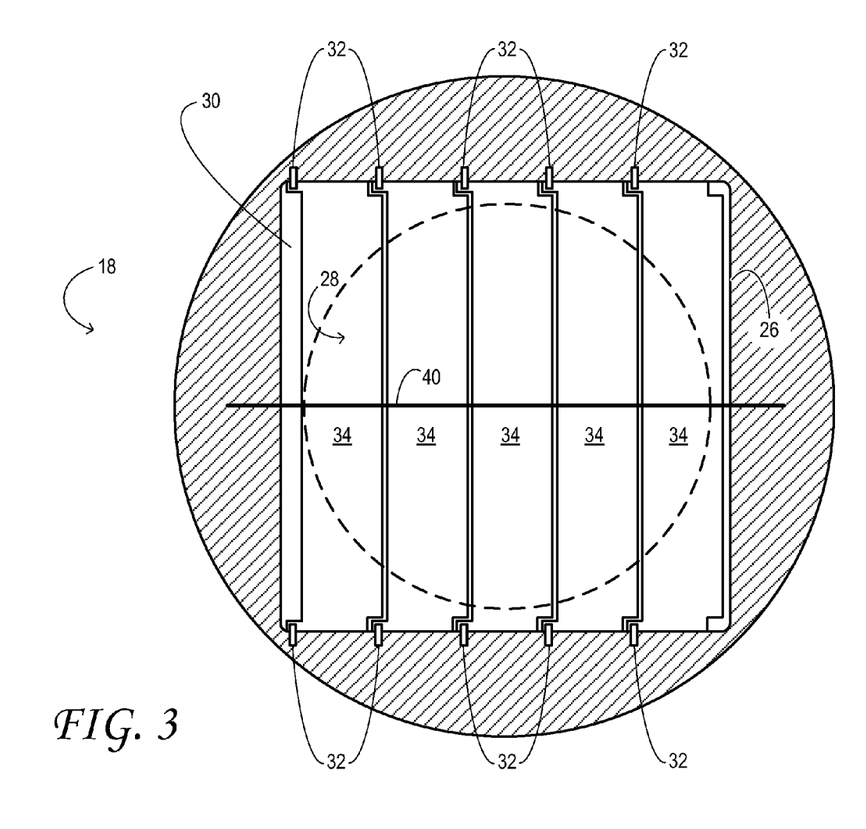
Figure 4:
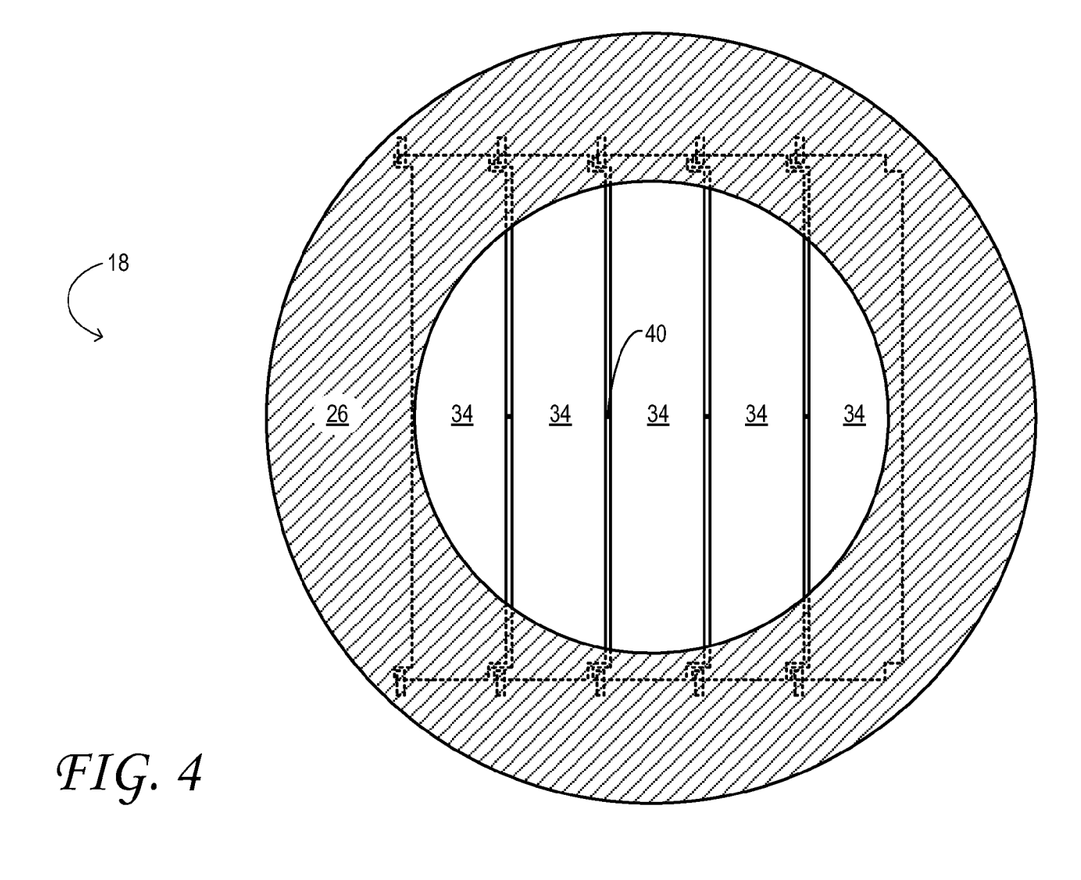

FIGS. 2, 3, and 4 show schematic, cross-sectional views of filling conduit 18 in one embodiment. The view in FIG. 2 is parallel to the direction of fuel flow through the filling conduit; the views in FIGS. 3 and 4 are normal to the direction of fuel flow, with FIG. 3 showing a view from the bottom of the filling conduit, and FIG. 4 showing a view from the top of the filling conduit.

Filling conduit 18 has an inner wall 26 that defines a substantially cylindrical flow area 28. The inner wall also includes a recessed section 30 in which one-way valve 24 is arranged. In the various embodiments of this disclosure, the one-way valve includes one or more pivotable blocking elements arranged in the conduit. As shown in the figures, the blocking elements pivot about an axis that traverses a path across the conduit. In particular, the blocking elements are pivotable between a flow-blocking, object-insertion blocking first position and a flow-admitting, object-insertion blocking second position. In one embodiment, the first position may be a substantially fully closed position where one or more blocking elements block fuel flow through the conduit. The second position may be a substantially open position where the one or more blocking elements allow fuel to flow freely down the conduit. Further, in the embodiments here disclosed, the blocking elements in the second position divide the conduit into flow areas of comparable width, as described hereinafter.

Continuing now in FIGS. 2, 3, and 4, one-way valve 24 includes a series of pivot pins 32. As shown in FIG. 3, the pivot pins are arranged on opposite sides of inner wall 26, where opposing pairs of pivot pins pivotally support a series of blocking elements—slats 34 in the illustrated embodiment. Arranged at equally spaced intervals across the filling conduit, these slats divide the conduit into flow areas of comparable width—e.g., flow areas within twenty percent of each other—which may prevent a siphon hose, if inserted into the filling conduit, from reaching the fuel in the fuel tank. Moreover, the slats are biased and configured with respect to each other so that the filling conduit conducts fuel in one direction only. In particular, the slats are configured to pivot from the first position to the second position in response to a downward flow potential in the conduit—viz., across the recessed region where the slats are arranged. However, when fuel or air trapped in the filling conduit exerts an upward flow potential in this region, the slats remain in the first position, blocking flow through the conduit. In embodiments that include more than one slat, as the illustrated examples show—adjacent slats seal one upon another in the first position; in the second position, the slats separate from each other.

As shown in FIG. 2, recessed section 30 is partly defined by imaginary planes 36 and 38, and slats 34 are aligned to the imaginary planes. In one embodiment, the imaginary planes may be normal to the direction of fuel flow through the filling conduit. In the illustrated embodiment, however, the imaginary planes are oblique to the direction of fuel flow, but parallel to the width direction of the slats. Relative to the normal orientation, the oblique orientation increases the distance between the slats in the second position, for reduced flow resistance and back pressure. As shown in FIG. 3, slats 34 may extend in width all the way across flow area 28.

Returning now to FIG. 2, filling conduit 18 includes at least one bias element 40. The bias element is configured to exert a force on the series of slats 34 that biases the slats to the first position, where the slats are rotated into contact with each other. The force is such as to pivot the slats from the second position to the first position when the fuel stops flowing down the filling conduit. In the embodiment shown in FIG. 2, the bias element extends across the filling conduit, below the slats, and between opposing sides of inner wall 26. Here, the bias element contacts and exerts an upward force on the series of slats. Accordingly, the bias element may comprise a resilient element—such as a spring—adapted to deform downwardly and to exert an upward restorative force. In one embodiment, the bias element is a length of spring steel attached to opposite sides of the inner wall of the filling conduit, as shown in FIG. 2. The end portions of the spring may each be received into a well or receiving nook formed in the conduit. Further, the end portions of the spring may have a serpentine shape to allow greater length deformation. The middle portion of the spring may be bent in an uneven U shape, as shown in FIG. 2, so that a substantially upward restoring force is applied to the series of slats when the serpentine end portions of the spring are stretched out. In this embodiment, the bias element spans the open space between the slats, which further restricts passage of a siphon hose down the conduit.

In another embodiment, two or more bias elements may extend, as described above, between opposite sides of inner wall 26. In another embodiment, a U-shaped bias element may extend from one side of the inner wall, into flow area 28, and back to substantially the same side of the inner wall. This bias element would deform by bending under the downward force of the open slats, and on bending back into shape would exert an upward restorative force on the slats. In still other embodiments, bias elements may be arranged elsewhere. For example, a bias element may be arranged in a pivot bearing of each slat—e.g., around pivot pin 32. Accordingly, the bias element may be configured to exert a torsional restorative force that biases the slats to the first position.

As shown in FIGS. 2 and 4, inner wall 26 extends part way above slats 34 in recessed section 30. In the first position, the planar top portion of each of the slats seals against the planar section of the inner wall bounded by imaginary plane 36. Thus, a sealing surface inside the conduit and above the slats is provided; the sealing surface is configured to seal against a top surface of the slats when the slats are in the first position. The inner wall in this part of the recessed section may comprise or support a resilient material, so that the slats, when biased to the first position, push into the inner wall, forming a tight seal. In one embodiment, the resilient material may comprise a hydrocarbon and/or alcohol resistant elastomer. In one embodiment, the elastomer may be provided in the form of a gasket.

Figure 5:
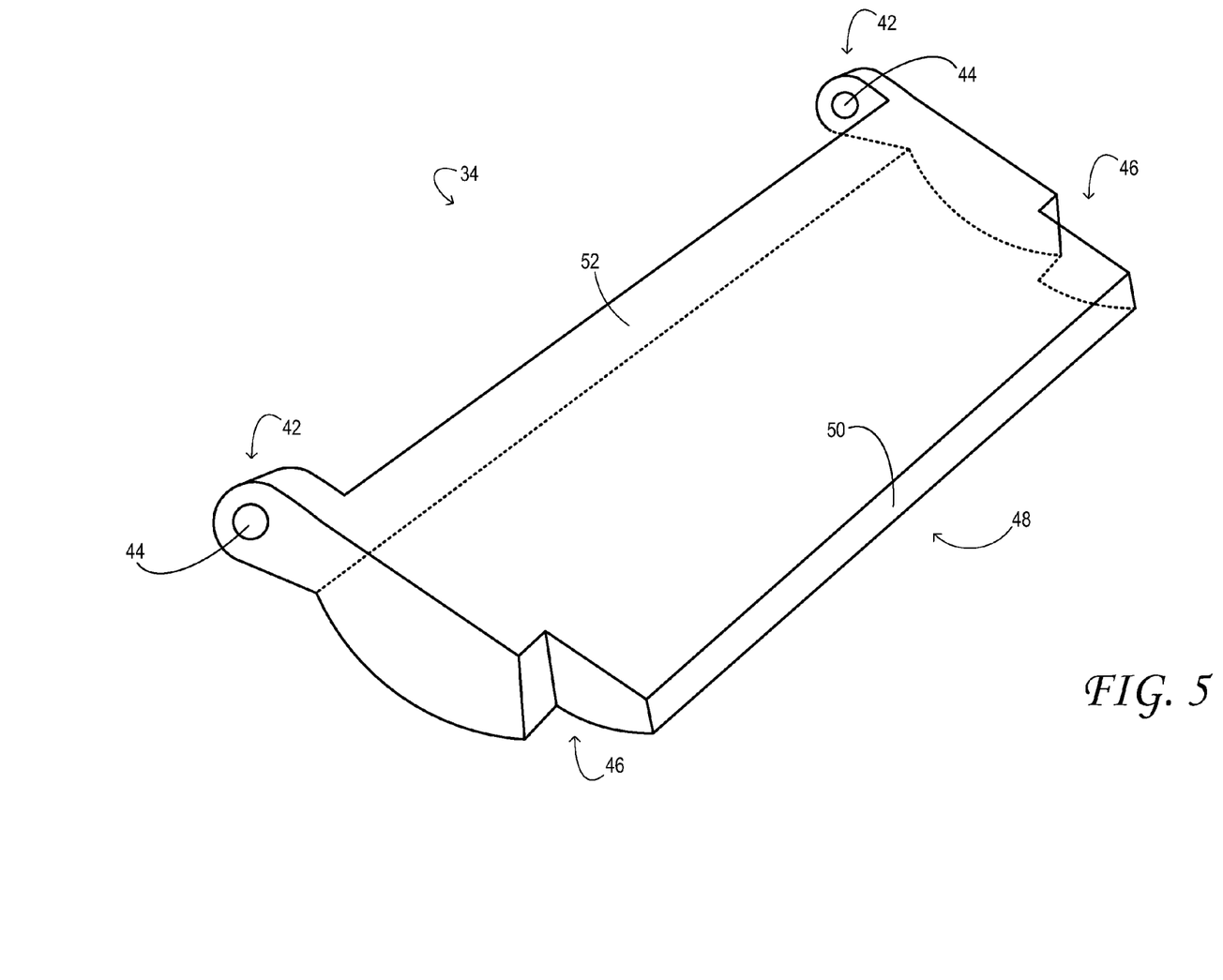
FIG. 5 shows a perspective view of a blocking element of a one-way valve in accordance with an embodiment of this disclosure.

FIG. 5 schematically shows a perspective view of slat 34 in one example embodiment. From this drawing, it will be appreciated that a front surface of one slat may seal against a complementary rear surface of an adjacent slat in the first position. The illustrated slat includes two opposing hinge sections 42, each hinge section including a bearing detent 44. The bearing detents are sized and shaped to receive pivot pins 32; they may extend all the way through the hinge section, or part way through the hinge section. The slat also includes two opposing nooks 46, which define a front tooth 48. The nooks are sized and shaped to receive the hinge sections of an adjacent slat.

Continuing in FIG. 5, front tooth 48 of slat 34 has a planar front surface 50, which is complementary to the planar rear surface 52 of the slat. Accordingly, when the series of slats is biased to the first position, the planar front surface of one slat seals against the planar rear surface of an adjacent slat. In one embodiment, therefore, one or both of the planar front surface and the planar rear surface may comprise or support a resilient material (e.g., a hydrocarbon and/or alcohol resistant elastomer) so that each slat, when biased to the first position, pushes into an adjacent slat, forming a tight seal.

Figure 6:
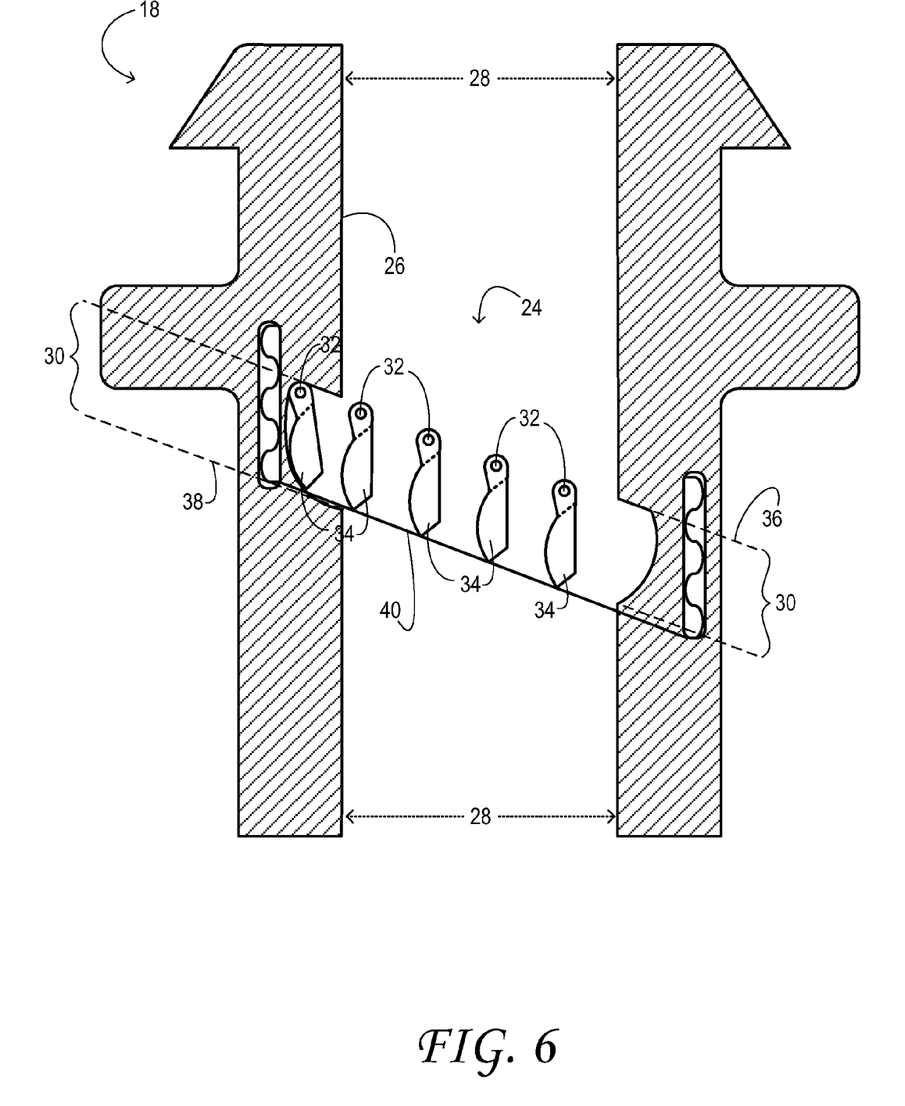
FIG. 6 schematically shows another cross-sectional view of a filling conduit of a motor vehicle in accordance with an embodiment of this disclosure.

Returning now to FIG. 2, filling conduit 18 is configured to admit fuel downward through flow area 28. To this end, slats 34 are configured to pivot to the second position in response to a downward flow potential across one-way valve 24. In the embodiments described herein, the downward flow potential present in this region may comprise the entire flow potential down the conduit. This is because no other flow-affecting structure (e.g., a separate grating for siphoning deterrence) need be present in the conduit. Such other flow-affecting structures, if present, would impart additional back pressure to the flow of fuel, such that the flow potential experienced across the one-way valve would be less than the entire flow potential down the conduit. In the illustrated embodiment, however, the threshold flow potential for pivoting the slats to the second position (e.g., the restorative force of bias element 40) can be made relatively small. Accordingly, the one-way valve may be configured to provide relatively little flow restriction to fuel flow down the conduit. This feature may increase the rate at which fuel can be fed into the fuel tank at a suitable delivery pressure. FIG. 6 schematically shows a cross-sectional view of the filling conduit with the slats in the second position. Here, the slats exert a deformative force on the bias element.

As noted above, one-way valve 24 is configured so that, in the second position, slats 34 divide the conduit into flow areas of comparable width. In other words, the slats divide a single flow area upstream of the valve into a plurality of separated flow areas, which rejoin downstream of the valve. The divided flow areas, in a plane normal to the direction of fuel flow, may have any suitable shape, but naturally the divided flow areas will be smaller than the cross-section of the conduit upstream of the one-way valve. In some embodiments, the divided flow areas will be too small to allow a siphon hose to fit between the slats, or between a slat and the inner wall of the conduit. In one particular embodiment, the divided flow areas may be no more than 5.2 millimeters (mm) in width. In another embodiment, the flow areas may be sized and shaped to block the smallest tube that can be inserted through the filling conduit. This width may be larger than the above, as some tube diameters may not be insertable all the way down the conduit.

It will be understood that other embodiments are equally embraced by this disclosure. For example, while it is indicated above that the blocking elements include bearing detents, which receive pivot pins coupled to the inner wall of the filling conduit, the reverse strategy is contemplated as well. Namely, the blocking elements may include pivot pins, and the inner wall may include a series of bearing detents to receive them. In another embodiment, the blocking elements may be more shutter-like, with a top surface of one blocking element sealing against a bottom surface of an adjacent blocking element in the first position. In another embodiment, the blocking elements may have an airfoil shape to reduce back pressure when the fuel is flowing over them. More specifically, the upstream end of each blocking element may be thicker than the downstream end, and the blocking element may present at least one smooth surface to the flowing fuel. In this manner, the blocking elements may be shaped to provide an opening torque due to lift force from the fluid flow, and thus provide minimum pressure drop in the second position. In other words, the blocking elements, in addition to being airfoil-shaped to minimize pressure drop, may be wing-shaped to provide a flow-induced lift force. This lift force may provide an opening torque that helps offset the closing force applied by the spring, thus reducing pressure drop associated with overcoming the spring force. The opening torque also minimizes the possibility of slat chatter. In yet another embodiment, the blocking element may be substantially circular, like the pivotable vane of a butterfly valve.

In still other embodiments, a one-way valve substantially as described herein may be arranged not in a recessed section of the filling conduit, but at a lower terminus of the filling conduit, i.e., where the filling conduit is coupled to the fuel tank. Thus, the one-way valve may be arranged inside the fuel tank, with the slats sealing, in the first position, against the lower terminus of the filling conduit.

Finally, it will be understood that the articles, systems and methods described herein are exemplary in nature, and that these specific embodiments or examples are not to be considered in a limiting sense, because numerous variations are contemplated. Accordingly, this disclosure includes all novel and non-obvious combinations and sub-combinations of the various systems and methods disclosed herein, as well as any and all equivalents thereof.

The invention claimed is:

1. A one-way valve comprising:
a plurality of blocking elements arranged in a vehicle fuel filling conduit, pivotable in a same rotational direction with respect to one another between a flow-blocking, object-insertion blocking first position and a flow-admitting, object-insertion blocking second position, in which second position the plurality of blocking elements divides the conduit into flow areas of comparable width; and
a bias element extending from one side of the conduit to an opposite side of the conduit and biasing the plurality of blocking elements to the first position.

2. The valve of claim 1, wherein each of the plurality of blocking elements is configured to pivot from the first position to the second position about a corresponding pivot axis in the same rotational direction with respect to the corresponding pivot axis in response to a downward flow potential in the conduit, and wherein the bias element pivots the plurality of blocking elements from the second position to the first position absent the downward flow potential.

3. The valve of claim 1, wherein at least one of the plurality of blocking elements comprises one or more of a slat and a vane, and wherein a smallest of the flow areas of comparable width is less than 5.2 millimeters in width.

4. The valve of claim 1, wherein the plurality of blocking elements are arranged in the conduit and configured to pivot from the first position to the second position in response to a downward flow potential in the conduit, and wherein adjacent slats seal one upon another in the first position and separate from each other in the second position.

5. The valve of claim 4, wherein the plurality of blocking elements are aligned to a plane, at least one of the plurality of blocking elements extending to overlap a pivot axis of an adjacent one the plurality of blocking elements in the first position, and wherein the plane is oriented obliquely with respect to a direction of fuel flow through the conduit.

6. The valve of claim 4, wherein a top surface of one of the plurality of blocking elements seals against a bottom surface of an adjacent one of the plurality of blocking elements in the first position.

7. The valve of claim 4, wherein a front surface of one of the plurality of blocking elements seals against a rear surface of an adjacent one of the plurality of blocking elements in the first position.

8. The valve of claim 1, wherein the bias element comprises a spring.

9. The valve of claim 8, wherein the spring extends across the conduit, below the plurality of blocking elements, and exerts an upward force on the plurality of blocking elements that biases the plurality of blocking elements to the first position.

10. The valve of claim 8, wherein each of the plurality of blocking elements pivots on a bearing in the same rotational direction with respect to the bearing, wherein the spring is arranged in the bearing and configured to exert a torsional force on the plurality of blocking elements that biases the plurality of blocking elements to the first position.

11. The valve of claim 1 further comprising a pair of opposing pivot pins arranged in the conduit, wherein each of the plurality of blocking elements includes two opposing hinge sections each having a bearing detent, and wherein the bearing detents of the hinge sections are configured to receive the opposing pivot pins.

12. The valve of claim 1 further comprising a pair of opposing bearing detents arranged in the conduit, wherein each of the plurality of blocking elements includes two opposing hinge sections each having a pivot pin about which each of the plurality of blocking elements rotates in the same rotational direction, and wherein the pivot pins of the hinge sections are received in the opposing bearing detents.

13. The valve of claim 1, further comprising a sealing surface inside the conduit, arranged above at least one of the plurality of blocking elements, and configured to seal against a top surface of the at least one of the plurality of blocking elements when the plurality of blocking elements are in the first position.

14. The valve of claim 1, wherein the valve is arranged in a recessed section of an inner wall of the conduit.

15. The valve of claim 1, wherein each of the plurality of blocking elements has, with respect to a direction of fuel flow in the second position, a downstream end, an upstream end thicker than the downstream end, and at least one smooth surface, and wherein the plurality of blocking elements are shaped to receive a lift force in the second position, when fuel is flowing.

16. A fuel system for a motor vehicle, the fuel system comprising:
    a fuel tank;
    a filling conduit fluidically coupled to the fuel tank; and
    a one-way valve coupled in the filling conduit, the valve comprising:
        a plurality of slats arranged in the conduit and configured to pivot from a flow-blocking, object-insertion blocking first position to a flow-admitting, object-insertion blocking second position in response to a downward flow potential in the conduit, in which second position the blocking element divides the conduit into flow areas of comparable width, the plurality of slats each having a hinge section, the hinge section of each of the plurality of slats pivoting about one or more pivot pins and overlapping an adjacent slat in the first position by nesting within a nook of the adjacent slat; and
        a bias element having end portions received into a receiving nook formed in the filling conduit, the bias element biasing the plurality of slats to the first position by pivoting the plurality of slats from the second position to the first position absent the downward flow potential.

17. The fuel system of claim 16, wherein the fuel tank is configured to store at least some ethanol.

18. The fuel system of claim 16, wherein a smallest of the flow areas of comparable width is less than 5.2 millimeters in a direction perpendicular to the plurality of slats.

19. A valve for a filling conduit of a motor-vehicle fuel tank, the valve comprising:
    two or more slats arranged in the conduit and configured to pivot from a flow-blocking, object-insertion blocking first position to a flow-admitting, object-insertion blocking second position in response to a downward flow potential in the conduit, in which first position a front surface of one slat seals against a rear surface of an adjacent slat, and in which second position the blocking element divides the conduit into flow areas of comparable width, the front and rear surfaces of adjacent slats separating from each other in the second position, the two or more slats each including two pivotable hinge sections opposite two opposing nooks, the two opposing nooks defining a front tooth that receives pivotable hinge sections of an adjacent slat when the valve is in the first position; and
    a spring extending across the conduit below the slats, and configured to exert an upward force on the slats, pivoting the slats from the second position to the first position absent the downward flow potential.

20. The valve of claim 19, wherein the valve is arranged in a recessed section of an inner wall of the conduit.

21. The valve of claim 16, wherein the slats are aligned to a plane, and wherein the plane is oriented obliquely with respect to a direction of fuel flow through the conduit.

* * * * *